(12) United States Patent
Gidney (10) Patent No.: US 9,268,768 B2
(45) Date of Patent: *Feb. 23, 2016

(54) NON-STANDARD AND STANDARD CLAUSE DETECTION

(71) Applicant: Seal Software Ltd., Godalming, Surrey (GB)

(72) Inventor: Kevin Gidney, Oslo (NO)

(73) Assignee: Seal Software Ltd., Godalming, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,069

(22) Filed: Jun. 16, 2014

(65) Prior Publication Data

US 2015/0161102 A1 Jun. 11, 2015

Related U.S. Application Data

(63) Continuation of application No. 14/098,512, filed on Dec. 5, 2013, now Pat. No. 8,781,815.

(51) Int. Cl.
*G06F 17/27* (2006.01)
(52) U.S. Cl.
CPC ........ *G06F 17/2785* (2013.01); *G06F 17/2775* (2013.01)
(58) Field of Classification Search
CPC ... G06F 17/2705; G06F 17/278; G06F 17/28; G06F 17/274; G06F 17/2775; G06F 17/2785; G06N 5/022; G06N 5/025; G04L 63/0227

USPC ................ 704/9, 8, 4, 2, 10, 1; 715/257, 230; 709/206, 204; 707/802, 776, 770, 766, 707/708; 706/45; 705/7.13

See application file for complete search history.

(56) References Cited

U.S. PATENT DOCUMENTS

| 3,662,400 | A | 5/1972 | Geil | |
|---|---|---|---|---|
| 5,577,241 | A | 11/1996 | Spencer | |
| 5,977,972 | A | 11/1999 | Bates et al. | |
| 6,263,335 | B1 * | 7/2001 | Paik | .................. G06F 17/30707 |
| 6,654,731 | B1 * | 11/2003 | Mahesh | ............... G06F 17/2795 706/45 |

(Continued)

OTHER PUBLICATIONS

PCT International Search Report and Written Opinion, PCT Application No. PCT/US2014/057893, Jan. 2, 2015, 21 pages.

(Continued)

*Primary Examiner* — Michael Colucci
(74) *Attorney, Agent, or Firm* — Fenwick & West LLP (57) ABSTRACT

A non-standard and standard clause detection system imports raw input data or contractual documents, and extracts non-standard and standard clauses that are semantically linked. One embodiment of a disclosed configuration is a system and a method for identifying non-standard and standard clauses in contractual documents. The system and the method comprise of generating a primary policy and a secondary policy, obtaining a first feature data set by applying the primary policy to a semantic language evaluator, and obtaining a second feature data set by applying the secondary policy to the semantic language evaluator. The first feature data set obtained is the aggregation of the standard clauses used in the document. Furthermore, the second feature data set encompasses the first feature data set, thus the difference between the first feature data set and the second feature data set is the aggregation of the non-standard clauses.

14 Claims, 7 Drawing Sheets

(56) References Cited

U.S. PATENT DOCUMENTS

| | | | |
|---|---|---|---|
| 6,675,170 B1 | 1/2004 | Flake | |
| 7,171,415 B2* | 1/2007 | Kan | G06F 17/30867 |
| 7,853,472 B2* | 12/2010 | Al-Abdulqader | G06Q 10/06 |
| | | | 705/7.13 |
| 7,885,981 B2* | 2/2011 | Kaufman | G06F 17/30392 |
| | | | 707/728 |
| 8,001,144 B2* | 8/2011 | Novak | G06F 17/278 |
| | | | 704/9 |
| 8,024,173 B1* | 9/2011 | Kinder | G06F 17/274 |
| | | | 704/1 |
| 8,249,856 B2* | 8/2012 | Shen | G06F 17/2872 |
| | | | 704/2 |
| 8,335,754 B2* | 12/2012 | Dawson | G06F 17/2705 |
| | | | 706/45 |
| 8,346,752 B2* | 1/2013 | Sirota | G06F 8/60 |
| | | | 707/708 |
| 8,346,795 B2* | 1/2013 | Roulland | G06F 17/30598 |
| | | | 707/706 |
| 8,359,191 B2* | 1/2013 | Chen | G06F 17/30734 |
| | | | 704/1 |
| 2001/0018698 A1 | 8/2001 | Uchino et al. | |
| 2002/0103818 A1 | 8/2002 | Amberden | |
| 2003/0023539 A1 | 1/2003 | Wilce et al. | |
| 2003/0046307 A1 | 3/2003 | Rivette | |
| 2003/0135520 A1 | 7/2003 | Mitchell et al. | |
| 2003/0195885 A1 | 10/2003 | Emmick et al. | |
| 2004/0107088 A1* | 6/2004 | Budzinski | G06F 17/27 |
| | | | 704/10 |
| 2005/0060140 A1 | 3/2005 | Maddox | |
| 2005/0108630 A1* | 5/2005 | Wasson | G06F 17/241 |
| | | | 715/230 |
| 2005/0182736 A1 | 8/2005 | Castellanos | |
| 2005/0210040 A1 | 9/2005 | Beres et al. | |
| 2006/0069545 A1* | 3/2006 | Wu | G06F 17/2705 |
| | | | 704/8 |
| 2007/0174766 A1 | 7/2007 | Rubin et al. | |
| 2008/0154873 A1 | 6/2008 | Redlich et al. | |
| 2008/0168135 A1* | 7/2008 | Redlich | G06Q 10/10 |
| | | | 709/204 |
| 2008/0178076 A1* | 7/2008 | Kritt | G06F 17/273 |
| | | | 715/257 |
| 2008/0189249 A1* | 8/2008 | Petakov | G06F 17/3087 |
| 2008/0306784 A1 | 12/2008 | Rajkumar et al. | |
| 2009/0076799 A1 | 3/2009 | Crouch et al. | |
| 2009/0132235 A1* | 5/2009 | Liu | G06F 17/2827 |
| | | | 704/4 |
| 2009/0132667 A1* | 5/2009 | Jung | H04L 51/12 |
| | | | 709/206 |
| 2009/0157385 A1* | 6/2009 | Tian | G06F 17/28 |
| | | | 704/9 |
| 2009/0204596 A1* | 8/2009 | Brun | G06F 17/278 |
| 2009/0281931 A1 | 11/2009 | Axilrod et al. | |
| 2010/0088338 A1 | 4/2010 | Pavoni, Jr. et al. | |
| 2011/0093771 A1 | 4/2011 | Gordon | |
| 2011/0231414 A1 | 9/2011 | Goodwin et al. | |
| 2012/0209876 A1* | 8/2012 | Thomas | G06Q 50/16 |
| | | | 707/770 |
| 2013/0006973 A1 | 1/2013 | Caldwell et al. | |
| 2013/0007578 A1 | 1/2013 | Shreck et al. | |

OTHER PUBLICATIONS

United States Office Action, U.S. Appl. No. 14/098,512, Feb. 21, 2014, 10 pages.

* cited by examiner

NON-STANDARD AND STANDARD CLAUSE DETECTION

RELATED APPLICATION

This application is a continuation of U.S. patent application Ser. No. 14/098,512 entitled "Non-standard and Standard Clause Detection" to Kevin Gidney filed on Dec. 5, 2013, the contents of which is incorporated by reference herein.

BACKGROUND

1. Field of Art

The disclosure generally relates to the field of natural language processing, and in particular, to identifying and extracting information from documents.

2. Description of the Related Art

A contract is a document that defines legally enforceable agreements between one and more parties. During the negotiation process, parties to the contract often agree to make multiple amendments or addendums, and these amendments or addendums can be stored in random formats in differing locations.

Frequent changes in contracts often present challenges to conventional approaches for finding contracts and amendments, as conventional approaches typically focus on the unstructured text only and are not able to extract relevant and important information correctly. In addition, conventional approaches find information only at the document level and attempt to locate actual text, sentences or sentence boundaries to allow for indexing. These approaches do not facilitate recognition, extraction, and grouping of clause types.

Moreover, conventional approaches cannot identify standard clauses that are distinctive clauses or terminologies used in each contract. Furthermore, conventional approaches cannot identify non-standard clauses that are unusual variations of the standard clauses and that are no longer reflecting the meaning of the standard clauses. For example, a contract and amendments may include the standard clauses that contain wording such as "net 30 days," "within 30 days," "30 day's notice," and "2% penalty." On the other hand, one of the amendments may include the non-standard clauses such as "5 working days" with "60% penalty." Without the ability to discover the non-standard clauses, any party not keeping track of the amendments or the addendums is vulnerable to a significant amount of risk of overlooking unusual contractual terminologies.

Accordingly, there is a need for a system that identifies and searches for non-standard and standard clauses used in contractual documents.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG. 1 illustrates one embodiment of a non-standard and standard clause detection system for a contractual document.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A document processing system includes a non-standard and standard clause detection system that imports raw input data or contractual documents, and extracts non-standard and standard clauses that are semantically related.

One embodiment of a disclosed configuration is a system for identifying non-standard and standard clauses used in contractual documents. An input processor configures raw input data into a format that can be structurally analyzed by a discovery engine. The discovery engine generates a pre-defined policy to be applied in a search engine. With the predefined policy, the discovery engine prepares initial search results to allow an administrator to select items to build and test a new custom policy along with all the predefined polices in a format that can be viewed by an end user. In the analysis engine, the end user can view the initial search results, and also customize the predefined policy to define a primary policy. With the primary policy, the analysis engine and the semantic language evaluator perform semantic language analysis, and first determine the standard clauses. Furthermore, the analysis engine and the semantic language evaluator perform another semantic language analysis with a less restrictive secondary policy to extract the non-standard clauses.

Non-Standard and Standard Clause Detection System

Figure 1:
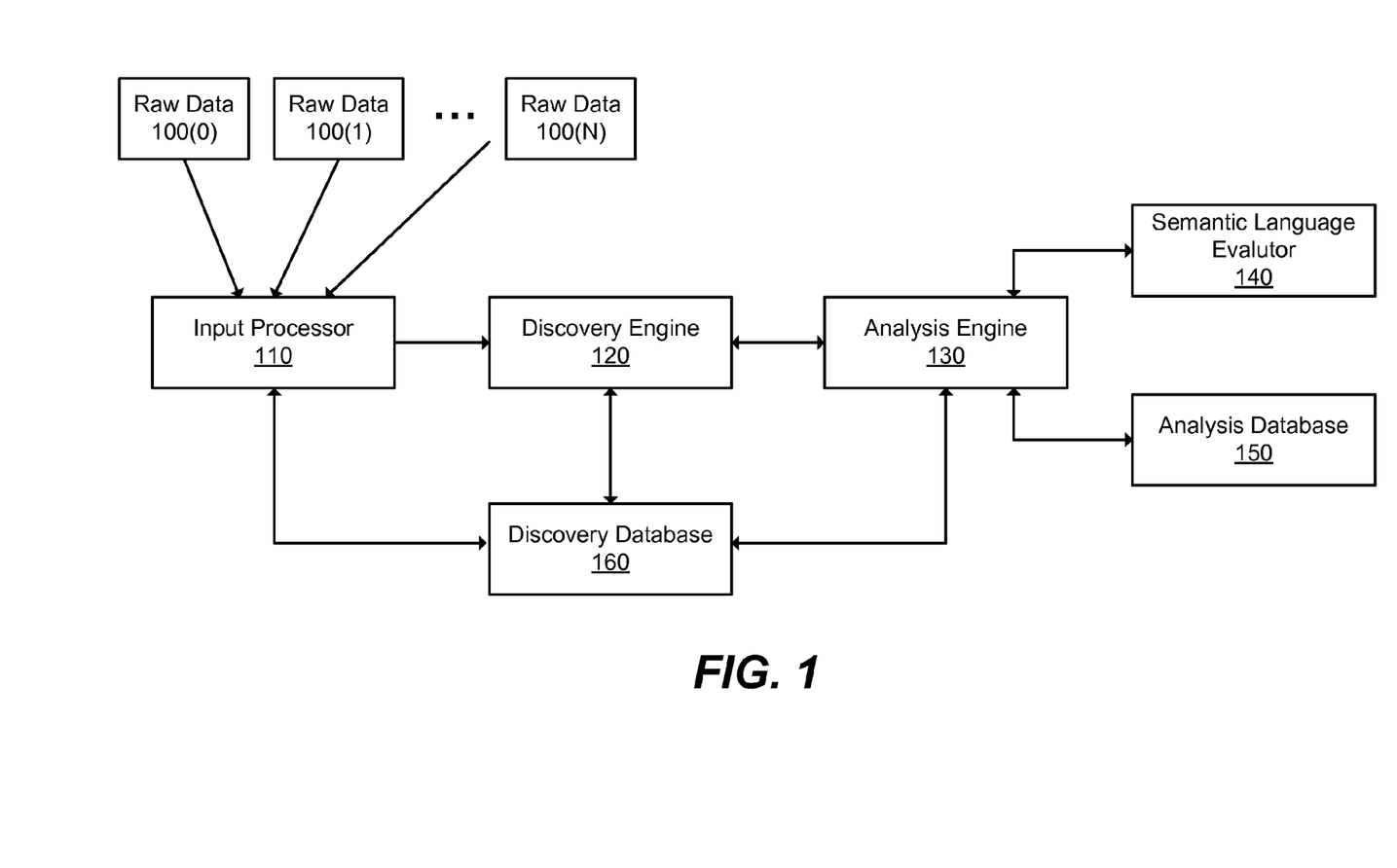

FIG. 1 illustrates one exemplary embodiment of a non-standard and standard clause detection system including one or more input processors (generally an input processor 110), a discovery engine 120, an analysis engine 130, a semantic language evaluator 140, an analysis database 150, and a discovery database 160. As illustrated in FIG. 1, the input processor 110 aggregates one or more raw data 100(0), 100(1) . . . 100(N) (generally 100) and processes them in an appropriate format. Also, the discovery engine 120 is communicatively coupled to the input processor 110. In addition, the analysis engine 130 is coupled to the discovery engine 120. The discovery engine 120 develops a predefined policy and initial search results. Additionally, the analysis engine 130 performs a semantic language analysis by applying two sets of policies to the semantic language evaluator 140, and determines the non-standard and standard clauses used in the raw data 100. Throughout the process the discovery database 160 stores the initial search results, metadata, and the predefined policy. In addition, the discovery database 160 is communicatively coupled to the input processor 110, the discovery engine 120, and the analysis engine 130. Additionally, the analysis engine 130 is coupled to the analysis database 150.

Figure 2:
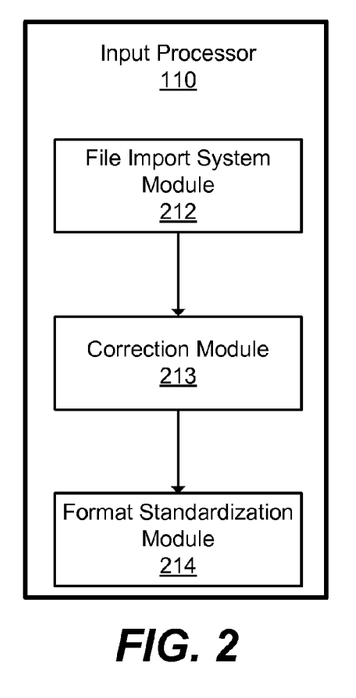
FIG. 2 illustrates a system for an input processor configured to process input data.

Turning to FIG. 2, it illustrates an exemplary embodiment of an input processor 110 that may aggregate the raw data 100, and refine them into acceptable formats in the following stages. As shown in FIG. 2, the input processor 110 includes a file import system module 212, a correction module 213, and a format standardization module 214.

The file import system module 212 receives the raw data 100 from any one of file systems, emails, Content Management Systems and physical document scanning devices. The file import system module 212 also detects potential contracts and checks if any duplicates of documents exist in the discovery database 160 already. In addition, the file import system module 212 can convert a physical document into another electronic format, for example Portable Document Format (PDF), Microsoft Office format, Tagged Image File Format (TIFF), Graphics Interchange Format (GIF), Join Photographic Experts Group (JPEG) and etc. Moreover, the file import system module 212 may include an image file processor module with an optical character recognition (OCR) engine (not shown). The OCR engine may be an ABBYY fine reader engine or a standard iFilter OCR engine. It is to be noted that other types of OCR engine or any combinations of OCR engine may be implemented. Furthermore, the file import system module 212 detects the language of the contractual document and how many words exist within.

The correction module 213 in the input processor 110 receives the data imported from the file import system module 212. The correction module 213 also is configured to apply typographical corrections or OCR corrections.

In an exemplary embodiment, the format standardization module 214 tailors the format of the data imported from the file import system module 212 for further processing. The format standardization module 214 applies filters to extract textual information. In addition, the input processor 110 may remove passwords to access a protected contractual document only when the owners of the documents agree to remove such passwords. Furthermore, the format standardization module 214 includes a file protection function that creates copies of potential contractual documents identified. These identified contractual documents are stored in the discovery database 160 with security access attributes.

Figure 3:
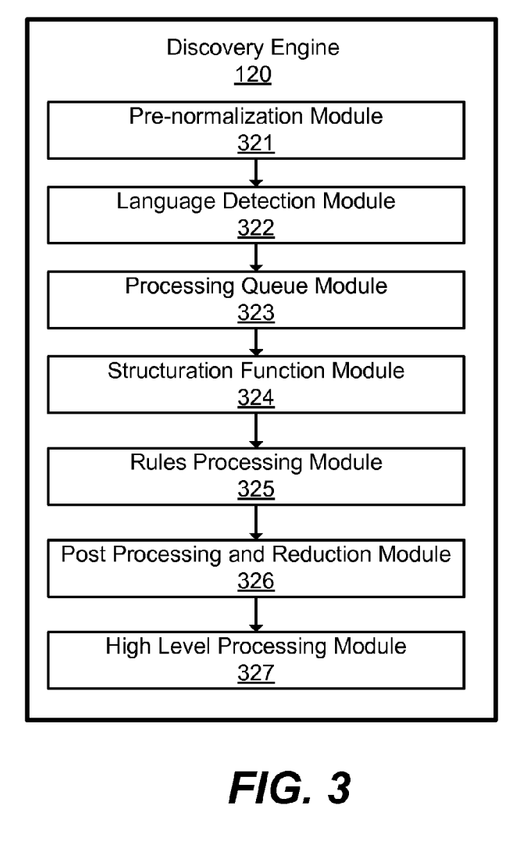
FIG. 3 illustrates a system for a discovery engine to properly structure and to normalize the input data.

Next, FIG. 3 illustrates an embodiment of the discovery engine 120 that structurally analyzes an input data from the input processor 110 and generates the predefined policy. The predefined policy includes, but not limited to, predefined rules, predefined features, and predefined clause examples.

The discovery engine 120 also applies the predefined policy into the search engine (not shown) and prepares initial search results along with the predefined policy and metadata in a format that allows the end user to view. As shown in FIG. 3, the discovery engine 120 includes a pre-normalization module 321, a language detection module 322, a processing queue module 323, a structuration function module 324, a rules processing module 325, a post processing and reduction module 326, and a high level processing module 327.

The pre-normalization module 321 receives the imported data in the standardized format obtained from the input processor 110, and converts the imported data into the standard XML or HyperText Markup Language (HTML) document. Also, the language detection module 322 can identify the language used in the XML or HTML converted document (e.g., English, German, and etc.), and place the document in the processing queue module 323.

Figure 4:
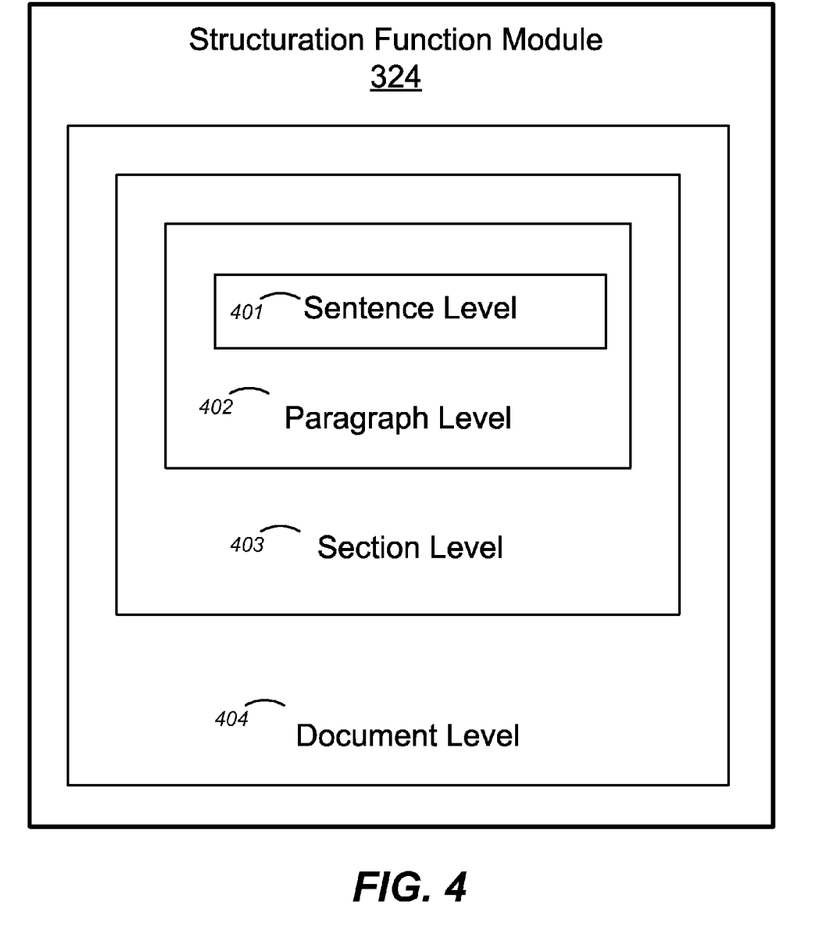
FIG. 4 illustrates a representation data stored as discreet database documents with three indexes.

Once the XML or HTML converted document is out of the processing queue module 323, the structuration function module 324 structurally analyzes the XML or HTML converted document into a plurality of hierarchical levels. In FIG. 4, illustrated is a representation of data stored as discreet database documents: a sentence level 401, a paragraph level 402, a section level 403, and a document level 404. Analyzing the documents or data in the structure mentioned above allows locating of terminologies and clauses used in the contractual documents.

Referring back to FIG. 3, following the structuration function module 324 is the rules processing module 325. In this stage, the discovery engine 120 applies the predefined rules to generate the predefined features. The predefined rules determine the logic or sequence of words, sentences, phrases, NLP (natural language processing) features, or terminologies. In addition, the rules processing module 325 generates the predefined features from the predefined rules for the end user to customize in the analysis engine 130. The predefined features can be a key reference or a descriptive verb that can describe the document and the information held within. For instance, the predefined features can be a start date, a termination date, a contract type, and etc.

In addition, the post processing and reduction module 326 reduces and normalizes the predefined features from the rules processing module 325. It is to be noted that in addition to sentence and paragraph boundaries, the discovery engine 120 can identify contractual section boundaries such as termination, limitation of liability, indemnity sections of a contract, and etc. Moreover, the post processing and reduction module 326 prepares the predefined features for the end user to customize in the analysis engine 130.

Normalization in the post processing and reduction module 326 reduces the common notations into a standard format. For instance, the same date can be expressed in multiple ways (e.g. Oct. 23, 1992, Oct. 23, 1992, Oct. 23, 1992, 23, Oct. 1992, 1992 Oct. 23 and etc.), and the normalization can convert various formats into standard ISO format. Normalizing to the standard format can eliminate confusions and improve processing speed. Most importantly, by consolidating into same notations, the discovery engine 120 can reduce any duplicate terms in different formats.

After the feature creation and normalization, the high level processing module 327 creates metadata and stores them in the discovery database 160. Additionally, the search engine communicatively coupled to the discovery database 160 obtains initial search results to determine the eligibility for analytics processing. Moreover, the high level processing module 327 prepares the predefined policy as well as the initial search results in a format that the end user can view. Furthermore, either one or both of an internal search engine and an external search engine may perform a search function.

Figure 5:
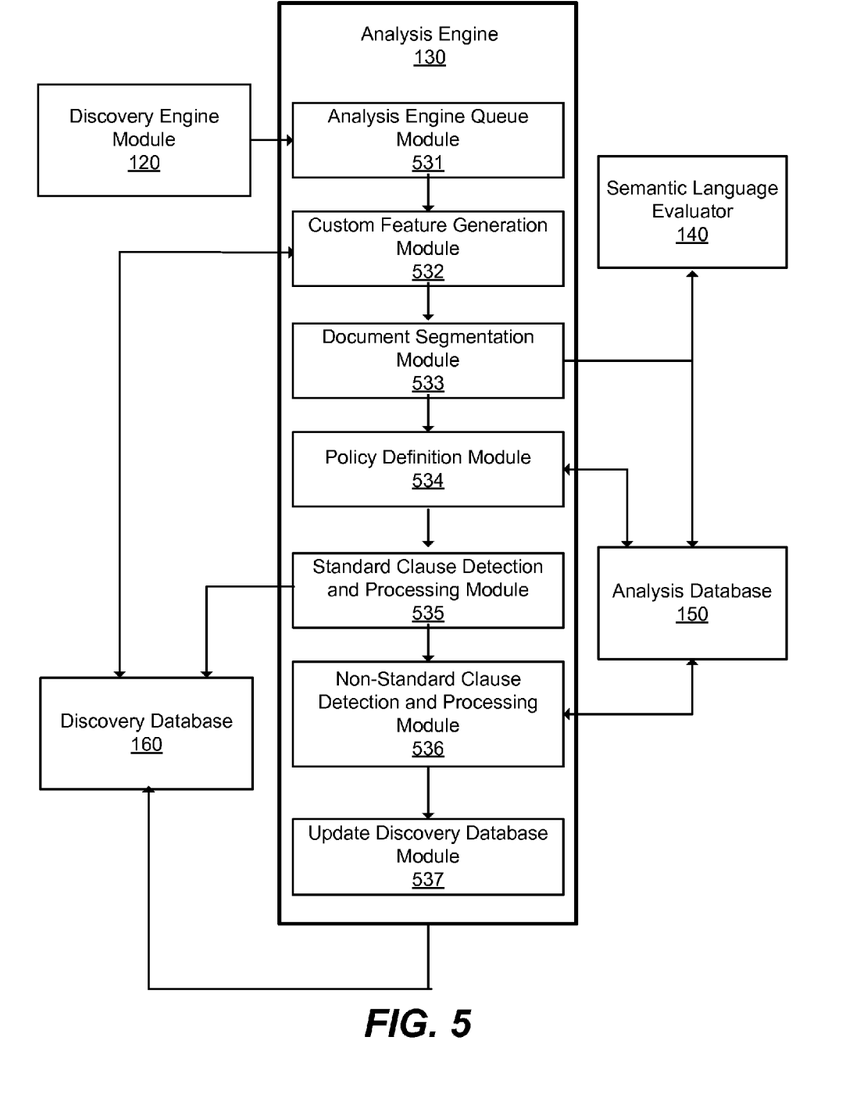
FIG. 5 illustrates a system for an analysis engine to define non-standard and standard clauses used in contractual documents.

Referring now to FIG. 5, illustrated is one embodiment of the analysis engine 130, which performs the key function in identifying non-standard and standard clauses. As illustrated, the analysis engine 130 includes an analysis engine queue module 531, a custom feature generation module 532, a document segmentation module 533, a policy definition module 534, a standard clause detection and processing module 535, a non-standard clause detection and processing module 536, and an update discovery database module 537.

The discovery engine 120 transfers a data set including the predefined policy, search indexes, the initial search results to the analysis engine queue module 531. Following the analysis engine queue module 531, the custom feature generation module 532 allows the end user to customize the predefined features obtained from the discovery engine 120 and to define primary features.

With the user defied primary features, the document segmentation module 533 replaces the actual text, phrases or clauses with the primary features. The semantic language evaluator 140 formed with the primary features replaced data set, ensures the accuracy and quality of the data. That is, the semantic language evaluator 140 accounts for minor anomalies within the clauses, allowing the analysis engine 130 to locate and group clauses based on the core semantics. The document segmentation module 533 transfers clause examples to the semantic language evaluator 140, and the semantic language evaluator assesses the similarity to each of the examples. In one exemplary art, the semantic language evaluator 140 may be a Latent Symantec Index (LSI) module, which may provide a cosine vector score based on the similarity and classify clauses accordingly. For instance, a cosine vector score of 1 indicates a high degree of similarity, when 0 indicates a low degree of similarity.

The policy definition module 534 allows the end user to define the primary policy that includes primary rules, primary features, primary clause examples and a first threshold. In one exemplary embodiment, a recommended value for the first threshold is '95' or between '90' and '99,' when the semantic language evaluator is the LSI module. In addition, the standard clause detection and processing module 535 applies the primary policy and extracts a first feature data set. The primary policy allows the analysis engine 130 to locate all clauses that are almost identical to the primary clause examples.

Afterward, the non-standard clause detection and processing module 536 may create a secondary policy, which is a copy of the primary policy that does not contain any rules and applies a second threshold, lower than the first threshold. In one exemplary embodiment, a recommended value for the second threshold is '60' or between '50' and '70, when the semantic language evaluator 140 is the LSI module. In addition, the non-standard clause detection and processing module 536 extracts a second feature data set with the secondary policy. The secondary policy allows the analysis engine 130 to locate all clauses that are semantically similar to the primary search examples. It is to be noted that, not only the second feature data set contains more data, but also contains exact match from the first feature data set. That is, the second feature data set encompasses the first feature data set. Since the first feature data set represents the standard clauses, the non-standard clause detection and processing module 536 can subtract the first feature data set from the second feature data set to extract the non-standard clauses.

Once the analysis engine 130 obtains the non-standard and standard clauses, the update discovery database module 537 may update the discovery database 160 with the non-standard and standard clauses obtained.

Policy Definition Process

Figure 6:
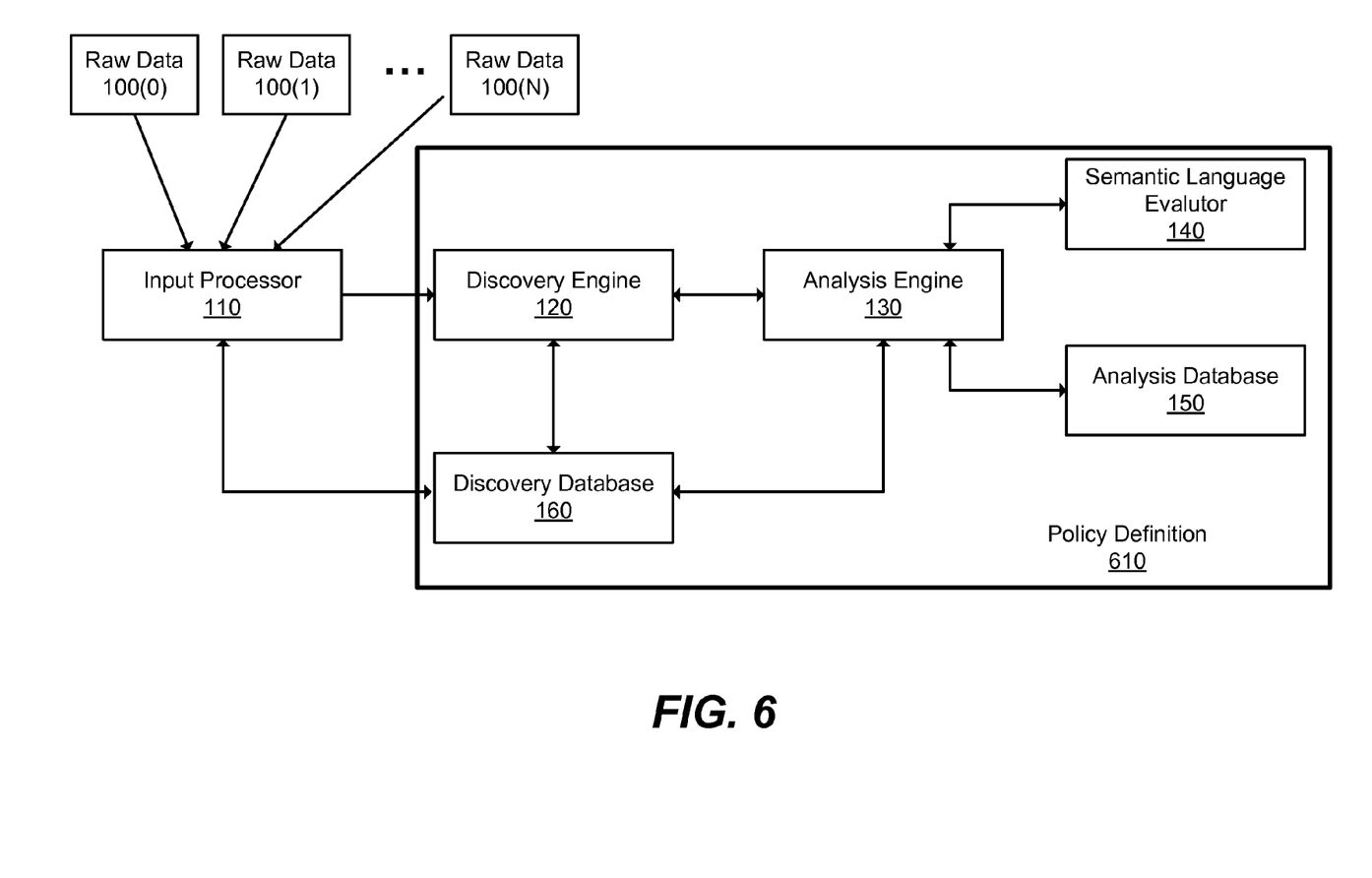
FIG. 6 illustrates a representation of systems involved in determining a policy definition to specify clauses for extraction.

The primary policy provides guidance on how and where to look for contract specific terminologies. Again, the primary policy may include the primary rules, the primary features, the primary clause examples and the first threshold for determining similarities. In FIG. 6, illustrated is a portion of an embodiment of the non-standard and standard clause detection system involved in a policy definition 610.

Figure 7:
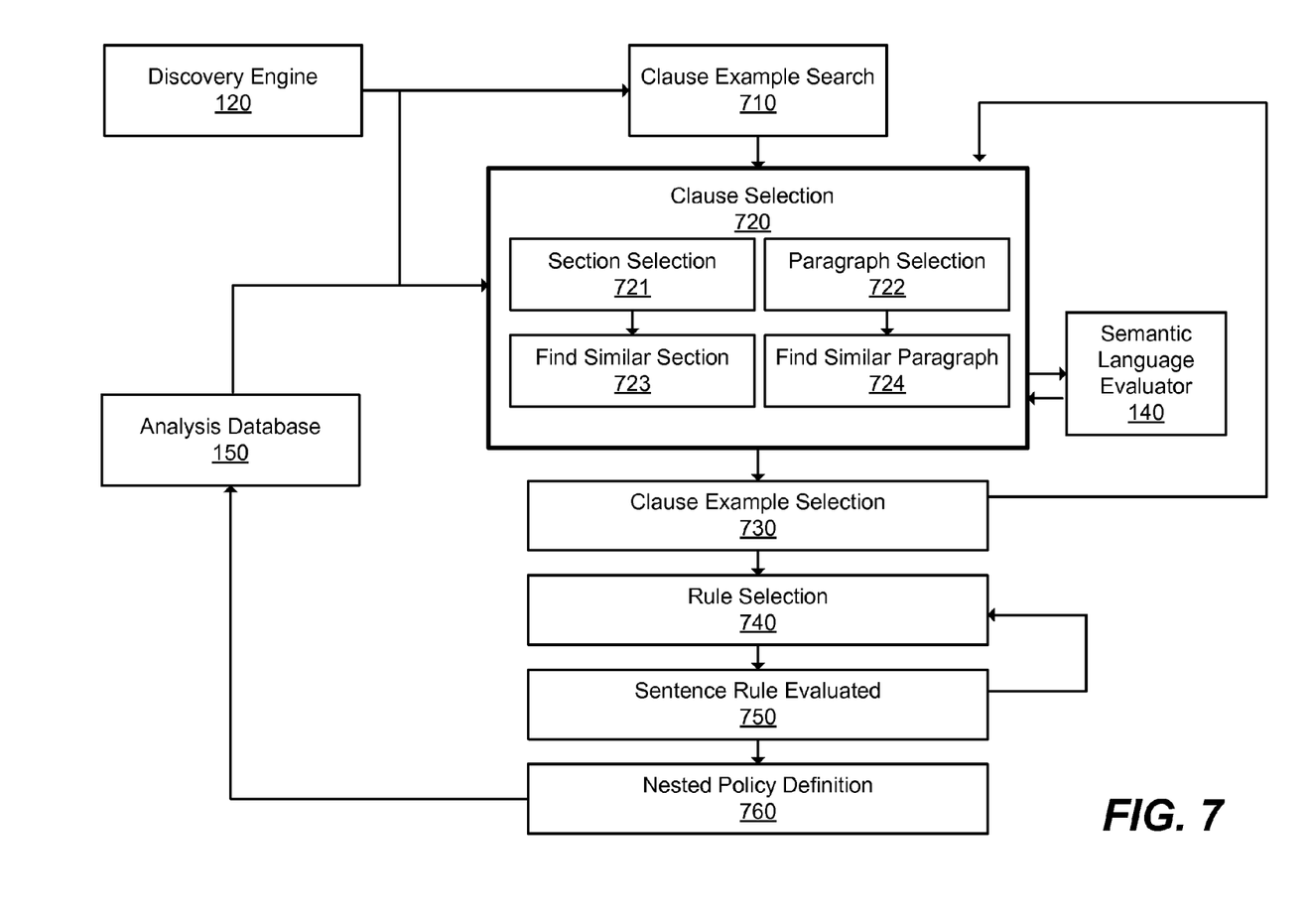
FIG. 7 illustrates a process for determining a policy definition to specify clauses for extraction.

FIG. 7 illustrates a process of determining the policy definition 610. First, the discovery engine 120 provides a discovery search index to a clause example search 710, and presents the predefined clause examples to the end user. The end user may search for the primary clause examples in the clause selection 720, either under a section or a paragraph. If the end user decides to look for a clause under the section, a section selection 721 loads the feature replaced data from the analysis database 150, and a find similar section 723 requests the semantic language evaluator 140 to query if similar features exist already within the index. Likewise, if the end user decides to look for a clause under the paragraph, a paragraph selection 722 loads the feature replaced data from the analysis database 150, and a find similar paragraph 724 requests the semantic language evaluator 140 to query if similar features exist already within the index.

The end user may select the primary clause examples from the search results in a clause example selection 730. Additionally, the end user may repeat the clause selection 720, and select new clauses.

Following the clause example selection 730, the end user may select the primary rules to determine the logic or sequence of words, sentences, phrases, or terminologies to be searched in a rule selection 740, and evaluate the selected rule in a sentence rule evaluated 750. In addition, the end user may repeat the clause selection 720 to add additional rules or select new clauses to be applied. Finally, the nested policy definition 760 updates the primary policy as well as the analysis database 150.

Data Storage Method

Referring back to FIG. 4, illustrated is a representation of data stored as discreet database documents. To enable the detection of the standard and non-standard clauses, each data set associated with a clause that may contain a unique identification number consists with the following indexes: a sentence level 401, a paragraph level 402, a section level 403, and a document level 404. In addition to the identification number, each data set may include actual text or features replaced for the clause, and the position of the clause.

During the process of defining policies and determining the non-standard and standard clauses, the discovery engine 120 and the analysis engine 130 communicates frequently with the discovery database 160 and the analysis database 150 for core processing repository and metadata storage location. In one exemplary embodiment, both databases contain information related to policies and the analysis database 150 may reside in the same hardware with the discovery database 160. However, the data structures in the analysis database 150 provide for two differing data sets for each sentence, paragraph, and section: one for exact text and another for features. Therefore, the storage requirement of the analysis database 150 may be demanding, but the analysis engine 130 can achieve advanced functionality including feature replacements. To reduce the extra storage requirement, the analysis database 150 may use a pointer, instead of creating copies of the entire data set.

Computing Machine Architecture

Figure 8:
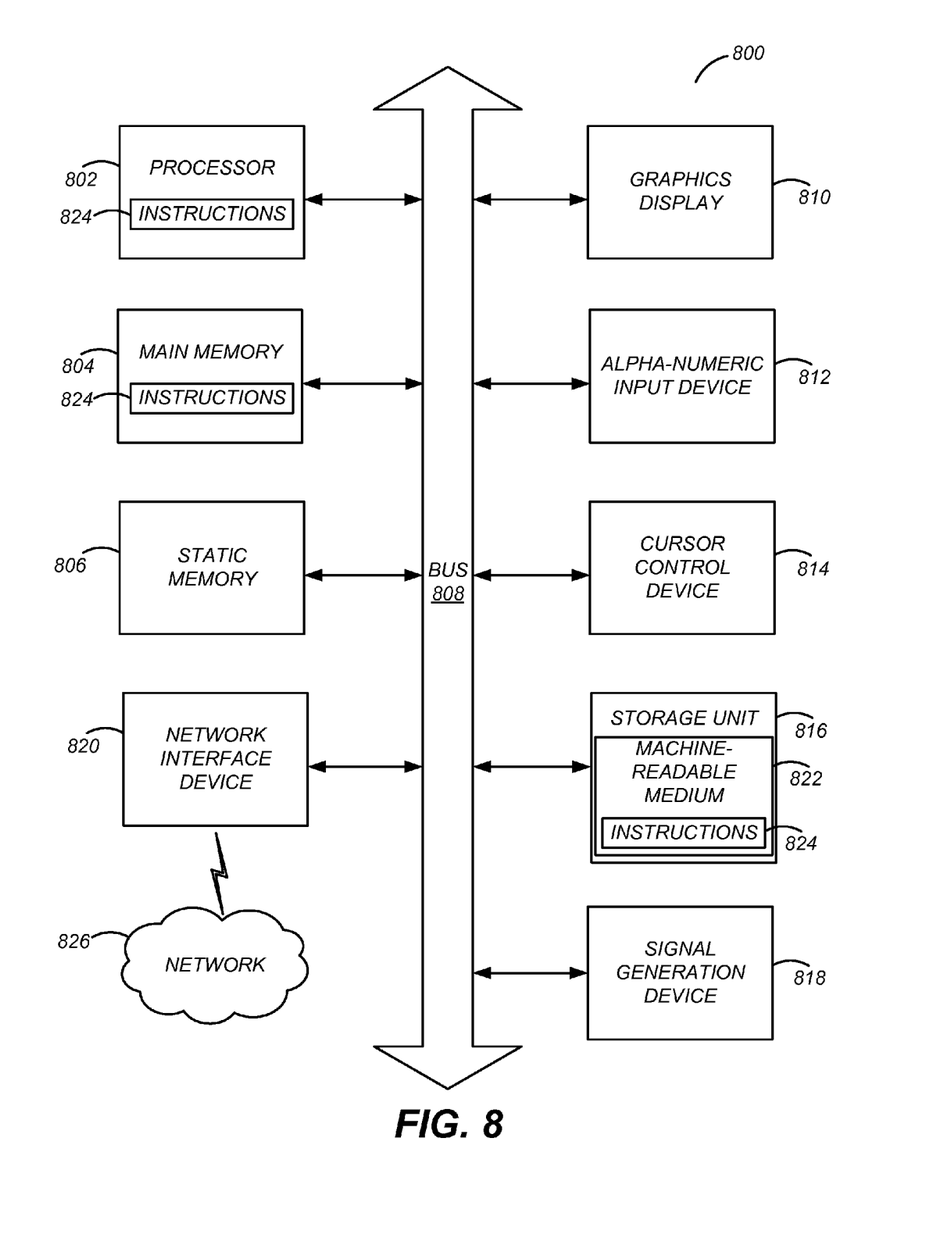
FIG. 8 illustrates components of an example machine able to read instructions from a machine-readable medium and execute them in a processor (or controller).

Turning now to FIG. 8, it is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software or program code) for causing the machine to perform (execute) any one or more of the methodologies described with FIGS. 1-7. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of contracts, the principles disclosed can apply to analysis of other documents that can include data corresponding to standard clauses and non-standard clauses. Advantages of the disclosed configurations include promptly identifying semantically related terminologies and extracting unusual variations of the semantically related terminologies in a large volume of documents. Moreover, while the examples herein were in the context of a contract document, the principles described herein can apply to other documents, including web pages, having standard and non-standard clauses.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for non-standard and standard clause detection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for identifying standard clauses and non-standard clauses in a document comprised of a plurality of original clauses, the system comprising:
   a processor; and
   a memory storing modules comprised of instructions executable by the processor, the modules comprising:
      a policy definition module configured to generate a primary policy;
      a standard clause detection module configured to apply the primary policy for performing a first semantic language evaluation to generate a first feature data set; and
      a non-standard clause detection module configured to:
         generate a secondary policy,
         apply the secondary policy for performing a second semantic language evaluation to generate a second feature data set, the second feature data set encompassing the first feature data set, and
         obtain a difference data set comprising a difference between the first feature data set and the second feature data set, the difference data set comprising the non-standard clauses.

2. The system for claim 1, wherein the memory further stores a semantic language evaluator comprised of instructions executable by the processor, the semantic language evaluator for performing the first semantic language evaluation using the primary policy and the second semantic language evaluation using the secondary policy.

3. The system for claim 1, wherein the modules further comprise a custom feature generation module configured to allow an end user to define primary features.

4. The system for claim 3, wherein the modules further comprise a document segmentation module configured to generate a plurality of feature replaced clauses by replacing each of the plurality of original clauses with the primary features.

5. The system for claim 1, wherein the modules further comprise a high level processing module configured to generate a predefined policy, wherein the policy definition module generates the primary policy based on the predefined policy.

6. The system for claim 5, wherein the memory further stores engines comprised of instructions executable by the processor, the engines comprising an internal search engine to obtain search results by applying the predefined policy.

7. The system for claim 5, wherein the memory further stores engines comprised of instructions executable by the processor, the engines comprising an external search engine to obtain search results by applying the predefined policy.

8. The system for claim 5, wherein the modules further comprise:
a pre-normalization module configured to convert textual information in the document into XML or Hyper Text Markup Language (HTML),
a language detection module configured to identify language used in the document,
a structuration function module configured to group the document into a sentence level, a paragraph level, a section level and a document level,
a rules processing module configured to generate predefined features from predefined rules, and
a post processing and reduction module configured to reduce the predefined features by removing duplicate features in the predefined features, the duplicate features comprising a plurality of the predefined features with equal representation,
wherein the high level processing module is configured to generate the predefined policy comprising predefined rules, predefined features and predefined clause examples.

9. The system for claim 1, wherein the modules further comprise:
a file import system module configured to receive raw input data comprising a document, the document comprising textual information,
a format standardization system module configured to obtain the textual information in a standardized format, and
a correction module configured to perform typographical corrections.

10. A system for identifying standard clauses and non-standard clauses in a document comprised of a plurality of original clauses, the system comprising:
an input processor configured to retrieve the document;
a memory storing modules comprised of instructions executable by a processor, the modules comprising:
a policy definition module configured to generate a primary policy,
a standard clause detection module configured to apply the primary policy for performing a first semantic language evaluation with a semantic language evaluator to generate a first feature data set, and
a non-standard clause detection module configured to:
generate a secondary policy,
apply the secondary policy for performing a second semantic language evaluation with the semantic language evaluator to generate a second feature data set, the second feature data set encompassing the first feature data set, and
obtain a difference data set comprising a difference between the first feature data set and the second feature data set, the difference data set comprising the non-standard clauses; and
a database.

11. The system for claim 10, wherein the memory stores engines comprised of instructions executable by the processor, the engines comprising an internal search engine communicatively coupled to the database to obtain search results by applying a predefined policy, wherein the policy definition module is configured to generate the primary policy based on the predefined policy.

12. The system for claim 10, wherein the memory stores engines comprised of instructions executable by the processor, the engines comprising an external search engine coupled to the database.

13. The system for claim 10, wherein the modules further comprise:
a file import system module configured to receive raw input data comprising a document, the document comprising textual information,
a format standardization system module configured to obtain the textual information in a standardized format, and
a correction module configured to perform typographical corrections.

14. The system for claim 13, wherein the modules further comprise:
a pre-normalization module configured to convert the textual information into XML or Hyper Text Markup Language (HTML),
a language detection module configured to identify language used in the document,
a processing queue module,
a structuration function module configured to group the document into a sentence level, a paragraph level, a section level and a document level,
a rules processing module configured to generate predefined features from predefined rules,
a post processing and reduction module configured to reduce the predefined features by removing duplicate features in the predefined features, the duplicate features comprising a plurality of the predefined features with equal representation, and
a high level processing module configured to generate a predefined policy comprising predefined rules, predefined features and predefined clause examples.

* * * * *